(12) United States Patent
Herrmann et al.

(10) Patent No.: US 9,954,377 B2
(45) Date of Patent: Apr. 24, 2018

(54) INDUCTIVE ROTARY JOINT

(71) Applicant: Schleifring und Apparatebau GmbH, Fürstenfeldbruck (DE)

(72) Inventors: Ulrich Herrmann, München (DE); Arno Zimpfer, Mammendorf (DE)

(73) Assignee: SCHLEIFRING UND APPARATEBAU GMBH, Fürstenfeldbruck (DE)

( * ) Notice: Subject to any disclaimer, the term of this patent is extended or adjusted under 35 U.S.C. 154(b) by 264 days.

(21) Appl. No.: 14/965,241

(22) Filed: Dec. 10, 2015

(65) Prior Publication Data

US 2016/0181825 A1    Jun. 23, 2016

(30) Foreign Application Priority Data

Dec. 18, 2014   (EP) ..................................... 14198916

(51) Int. Cl.
| | | |
|---|---|---|
| *H02J 5/00* | (2016.01) | |
| *H05G 1/10* | (2006.01) | |
| *H01F 38/18* | (2006.01) | |
| *H02J 50/10* | (2016.01) | |

(52) U.S. Cl.
CPC ............. *H02J 5/005* (2013.01); *H05G 1/10* (2013.01); *H01F 38/18* (2013.01); *H02J 50/10* (2016.02)

(58) Field of Classification Search
None
See application file for complete search history.

(56) References Cited

U.S. PATENT DOCUMENTS

| | | | |
|---|---|---|---|
| 7,197,113 B1 | 3/2007 | Katcha et al. | |
| 2011/0002446 A1* | 1/2011 | Beland | ..................... H05G 1/10 |
| | | | 378/111 |
| 2011/0286580 A1* | 11/2011 | Beland | .................. H02M 1/088 |
| | | | 378/111 |
| 2013/0214614 A1* | 8/2013 | Krumme | .................. A61B 6/56 |
| | | | 307/104 |

OTHER PUBLICATIONS

Tang, "An Interleaved Reduced-Component-Count Multivoltage Bus DC/DC Converter for Fuel Cell Powered Electric Vehicle Applications", IEEE Transactions on Industry Applications, vol. 44, No. 5, Sep. 2008, pp. 1638-1644.

* cited by examiner

*Primary Examiner* — Jared Fureman
*Assistant Examiner* — Aqeel Bukhari
(74) *Attorney, Agent, or Firm* — Yakov S. Sidorin; Quarles & Brady LLP (57) ABSTRACT

An inductive power transfer circuit comprises an inductive rotary coupling with a primary side rotatably arranged a secondary side. The primary side has a primary winding and the secondary side has at least two secondary windings. The secondary windings deliver a signal with the same phase and are connected at one end to a pair of capacitors, being further connected to a positive output and a negative output. The other ends of the secondary windings each are separately connected to a pair of rectifiers connected in forward direction to the positive output and in reverse direction to the negative output.

By paralleling multiple secondary windings and rectifier circuits, the stray inductances and capacitances can be reduced which further leads to a reduced base load which helps to reduce total energy consumption of the circuit.

16 Claims, 5 Drawing Sheets

INDUCTIVE ROTARY JOINT

CROSS-REFERENCE TO RELATED APPLICATIONS

This application claims priority from and benefit of European Patent Application No. 14198916.0 filed on Dec. 18, 2014. The disclosure of this European Patent Application is incorporated by reference herein.

BACKGROUND

1. Field of the Invention

The invention relates to an inductive power transfer device configured to couple electrical power between two units that are rotatable with respect to each other, and, specifically to power couplers for use in computer tomography scanners. Such power couplers are also known as rotary joints.

2. Description of Relevant Art

In a computer tomography (CT) scanner and other related machines high-power in the range from 10 kW up to more than 100 kW is transferred from a stationary side to a rotating side of the scanner. There, a high voltage at levels above hundred kilovolts is generated to produce x-ray radiation.

In U.S. Pat. No. 7,054,411 a multiple-channel inductive rotary joint is disclosed. It has inductive channels for transferring power from the stationary side to the rotating side. There is an auxiliary power and a main power circuit. Furthermore a capacitive feedback link for power control is provided.

SUMMARY

The embodiments of the invention provide an inductive power transfer device or rotary joint, which has a large dynamic range and requires a low base load.

In an embodiment, an inductive rotary joint is built like a power transformer, where one side is rotating against another side. For example, in CT scanners, power has to be transferred from the stationary side of a scanner to its rotating side. Therefore, the power coupler is a transformer having a stationary primary winding and a rotating secondary winding. For simplicity, the following explanations and embodiments refer to such a CT-scanner rotary joint. The same type of implementation can be applied to any rotary joint in general and furthermore not only to a rotary joint for transferring power from a stationary side to a rotating side, but also to a rotary joint configured to transfer power from a rotating side to a stationary side.

As a transformer can only transfer AC (alternating current), it is either fed by an AC line voltage or by an inverter, generating an AC voltage of a higher frequency which can better be transferred via a rotating transformer. Therefore, it is preferred to have an inverter at the primary or input side. At the secondary or output side, in most cases this AC voltage is converted to a DC voltage to provide a DC output. This may be done by a bridge rectifier, followed by a filtering capacitor to generate a smooth DC voltage.

In certain environments, like a CT scanner, the load range of the inductive power transfer device is broad. Under full load conditions, an X-ray tube may be supplied with power in an order of 100 kW or more. During idling, when most of the systems like the X-ray tube and the detector are off, only a small number of low power consuming devices must be supplied with electrical power. In the past few years, the power consumption of computers, memories, and other electronic components has continuously decreased, so that the idling power of CT scanners also decreased significantly, whereas the required full load power of the X-ray tubes has increased due to higher X-ray power requirements. A rotary joint as used in a CT scanner is comparatively large. A typical CT scanner may have a diameter of between 1 m and 1.5 m. Therefore, the primary winding and the secondary winding are also comparatively large. Furthermore, it is impossible to have an extremely small air gap between the rotating and stationary parts, as there are mechanical tolerances. This causes a comparatively large stray inductance of the transformer. The large diameter further results in large windings and therefore in comparatively large parasitic capacitances within the windings, between the windings and between individual turns of the windings. The stray inductance or parasitic inductance in conjunction with the parasitic winding capacitances causes a parasitic resonant circuit which leads to an increase of the output voltage under high Q conditions of the parasitic resonant circuit which are met when the load at the output of the power coupler has a high resistance. Therefore, a high output resistance or low load drawing a low power at the output causes the output voltage to increase. This may lead to damaging of electronic components at the rotating side. To prevent an unwanted increase of output voltage, there may be a base load or dummy load which decreases the Q factor of the resonant circuit, and therefore decreases the output voltage in an idle state. A dummy load is not economical and requires further components like a high power resistor and cooling means like fans. Therefore it is desirable to design the inductive power coupler, such that no dummy load is required or at least the power dissipated in a dummy load is reduced.

To reduce the required dummy load, an increase of the output voltage is reduced in an inductive power coupler. This is done by reducing the stray inductance and the total parasitic capacitance in the inductive power coupler and by providing a new rectifier circuit.

In a first embodiment, there are at least two secondary windings on the secondary side, which preferably is the rotating side. These secondary windings are wound in the same direction, have the same number of turns, and are connected together either at the beginning of the windings or at the end of the windings at a common connection point. This common connection point is connected to a pair of capacitors, wherein the first capacitor is connected to a positive output, and the second capacitor is connected to the negative output. The other ends of the windings are each connected to a pair of rectifiers. For each secondary winding, an individual pair of rectifiers is provided. If there are multiple secondary windings connected to the same pair of rectifiers, this works like a single secondary winding in the sense of this embodiment.

Each pair of rectifiers includes a first rectifier connected in a forward direction to the positive output, and a second rectifier in reverse direction connected to a negative output. Preferably, at least one of the rectifiers comprises a diode, but it may also comprise any equivalent element, like an actively controlled switch which may be a FET.

By this circuit, a plurality of windings are connected in parallel in the same direction by means of rectifiers.

Compared to a full-bridge rectifier, which simply delivers an output voltage roughly corresponding to one half of the peak to peak AC voltage coming from a secondary winding, this circuit acts as a voltage doubler and delivers approximately the full peak-to-peak output voltage of a secondary winding. For this reason, each secondary winding requires only half the number of turns compared to a circuit supplying a full-bridge rectifier. As a result, the energy stored in the parasitic capacitance is significantly lower and, therefore, a lower dummy load or higher dummy load resistance is required, which further leads to lower heat dissipation during idling.

In a further embodiment, at least two secondary windings are wound parallel. This means that the wires of the windings are guided in parallel, preferably in close contact to each other. This leads to a significantly reduced parasitic capacitance between the turns. At the areas where the turns are in close proximity to each other, there is a comparatively large parasitic capacitance between the neighbored turns. As the windings are wound in the same direction, there is no voltage difference between the neighbored turns, and therefore the parasitic capacitance does not lead to a movement of charges, and therefore a parasitic current flow. As a result, this component of the parasitic capacitance has no effect. Therefore, the total parasitic capacitance can be significantly reduced by aligning the at least two windings in parallel.

It is required that there are at least two secondary windings, but there may be any higher number of secondary windings.

In a further preferred embodiment, there is a DC/DC converter between the positive output and negative outputs and the load. This DC/DC converter may be an up-converter a down converter or a combination thereof. It also may be switchable between up- and down-conversion. Alternatively, there may also be a DC/AC converter.

In a further embodiment, the first capacitor and the second capacitor dimensioned as part of the total resonance capacitance of a series resonance converter.

Furthermore, it is preferred, if the total resonance capacitance of a series resonance converter is formed by at least one primary resonance capacitor (131) and on the secondary side a first capacitor (231) and a second capacitor (232).

According to another embodiment, the total resonance capacitance of a series resonance converter is formed by at least one primary resonance capacitor (131) and on the secondary side a first capacitor (231) and a second capacitor (232) being approximately evenly distributed between primary and secondary side. Therefore, the total capacitance of the at least one primary resonance capacitor (131) and the total capacitance of the secondary side capacitors (231, 232) are approximately equal.

Furthermore, the winding ratio primary to secondary winding may be approximately 2. When dimensioning the capacitors the winding ratio needs to be considered. For example, with the capacitance evenly distributed between primary and secondary side and a winding ratio of 2 of primary to secondary winding the secondary capacitors (231, 232) capacitance each should have approximately 2 times the value of the primary capacitor's (131) capacitance which has approximately half the value of the total resonance capacitance necessary.

In a further embodiment, the ratio of the total capacitance of the at least one primary resonance capacitor and the total capacitance of the secondary side capacitors is approximately equal to the square of the winding number ratio of the at least one secondary winding to the at least one primary winding.

It is most efficient to use the embodiments disclosed herein in large rotating power transformers, as in such large units there such use provides a significant operational improvement, although it may be beneficial to apply the embodiments to smaller units.

BRIEF DESCRIPTION OF THE DRAWINGS

In the following, the invention will be described by way of example, without limitation of the general inventive concept, on examples of embodiment and with reference to the drawings.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Figure 1:
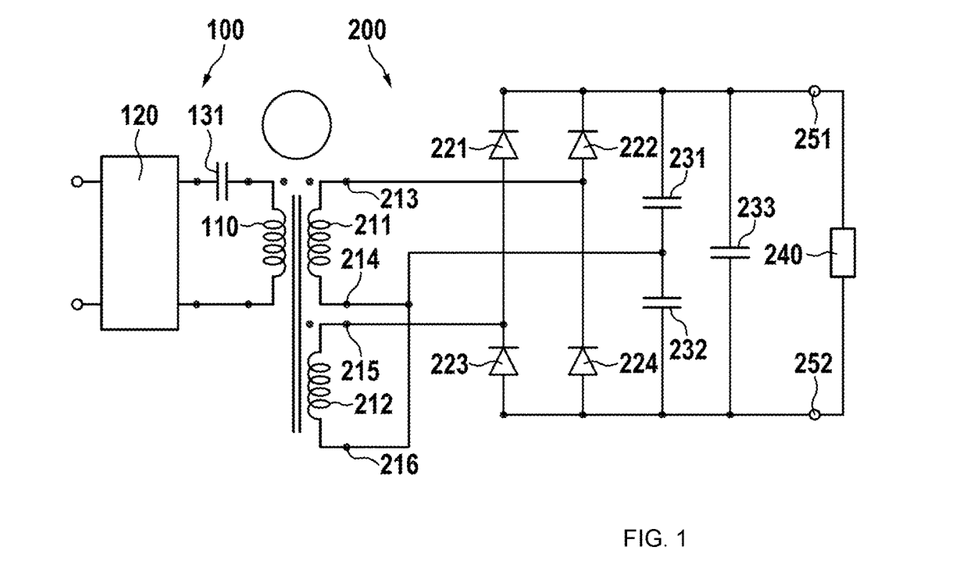
FIG. 1 shows a preferred embodiment.

In FIG. 1, a preferred embodiment with two separate primary windings is shown. It is required that there are at least two secondary windings, but may be any higher number of secondary windings can be employed.

An inductive power coupler has a primary side 100 and a secondary side 200, which are rotatable against each other.

At the primary side 100, there is a primary winding 110, which preferably is supplied by an inverter 120 with an AC signal, preferably having a frequency significantly higher than the standard line frequency. Preferably, there is a primary resonance capacitor 131 between the inverter and the primary winding. It is preferred to have a frequency in the range from 1 kHz to 100 kHz, preferably between 20 and 40 kHz. At the secondary side 200, there are at least two secondary windings with a first secondary winding 211 and a second secondary winding 212 as shown in this figure. The dots marked on the top of the windings show the beginnings of the windings or the ends of the windings. It is not essential which end of a winding is meant, but it is essential that the windings are oriented in the same direction and have the same number of turns. The orientation of the secondary windings with respect to the primary winding is not critical, and may be changed without any negative effect. Furthermore, there may be any number of primary windings. The first secondary winding 211 has a first output 213 and a second output 214. The second secondary winding 212 has a first output 215 and a second output 216. The second outputs 214 and 216 are connected together and are further connected to a first capacitor 231, and a second capacitor 232. The first capacitor 231 being connected to a positive output 251 and the second capacitor 232 being connected to a negative output 252. The first capacitor 231 and the second capacitor 232 are dimensioned as resonance capacitors. It is preferred, if the primary resonance capacitor 131 and the secondary resonance capacitors (231, 232) have approximately the same values, which results in a further lowering of the output voltage at underload. Due to the same orientation of the first and the second secondary windings, the output signals at the first winding outputs 213 and 215 are the same. Each of the first winding outputs is connected to a pair of rectifiers 222, 224 and 221, 223. The rectifiers are oriented in a forward direction towards the positive output 251 and in a negative direction to the negative output 252. Preferably, there is a secondary filter capacitor 233 between the positive output 251 and the negative output 252 parallel to the load. Basically, there are two parallel voltage doubler circuits. Due to the voltage doubling, the output voltage of each winding is twice the voltage compared to a bridge rectifier circuit. As a consequence, the number of required turns may also be half the number of a bridge rectifier circuit. Consequently, the inductance of the windings is ¼, resulting in a reduced stray inductance about Vt. This leads to a significantly reduced energy in the inductive circuit, and therefore, the minimum load at the load component 240 can be reduced significantly. Tests have shown on large inductive couplers like these used for CT scanners, that the minimum load is about half the minimum load of a full-bridge circuit or a regular half bridge circuit. Therefore, a dummy load, which may be part of the load 240, can be reduced.

Figure 2:
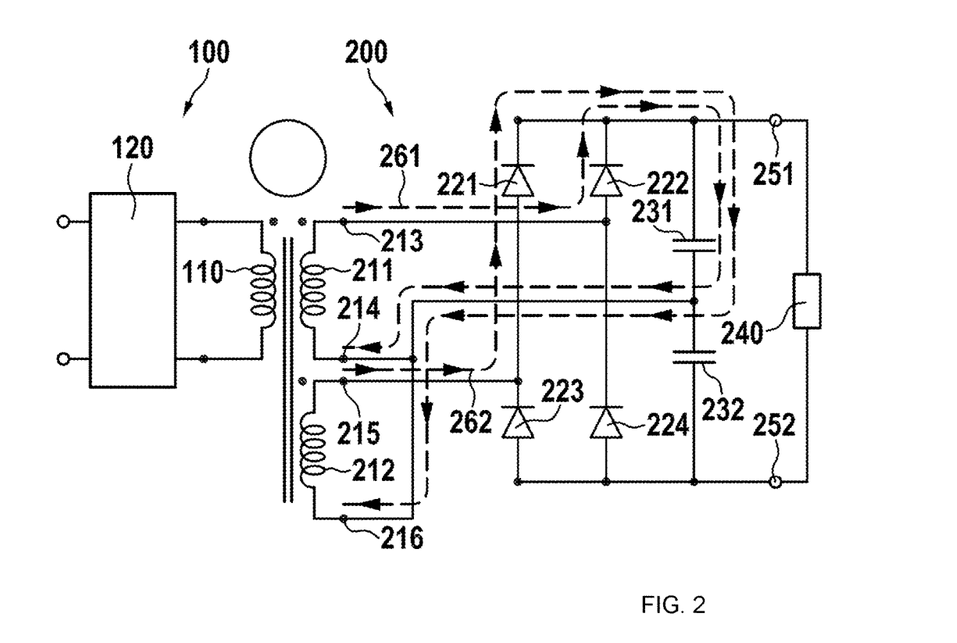
FIG. 2 shows a first current diagram.

In FIG. 2, a first simplified current diagram is shown with the voltages at the first winding output 213, 215 being positive with respect to the voltages at the winding outputs 214, 216. There is a first current path 261 from the first winding output 213 of the first secondary winding, propagating through rectifier 222 to the positive output 251 and via capacitor 231 to the second winding output 214 of the first primary winding. From the second secondary winding 212, current propagates beginning from its first winding output 215 via a second current path 262 through rectifier 221 to the positive output 251 and via capacitor 231 back to the second winding output 216 of the second secondary winding 212.

Figure 3:
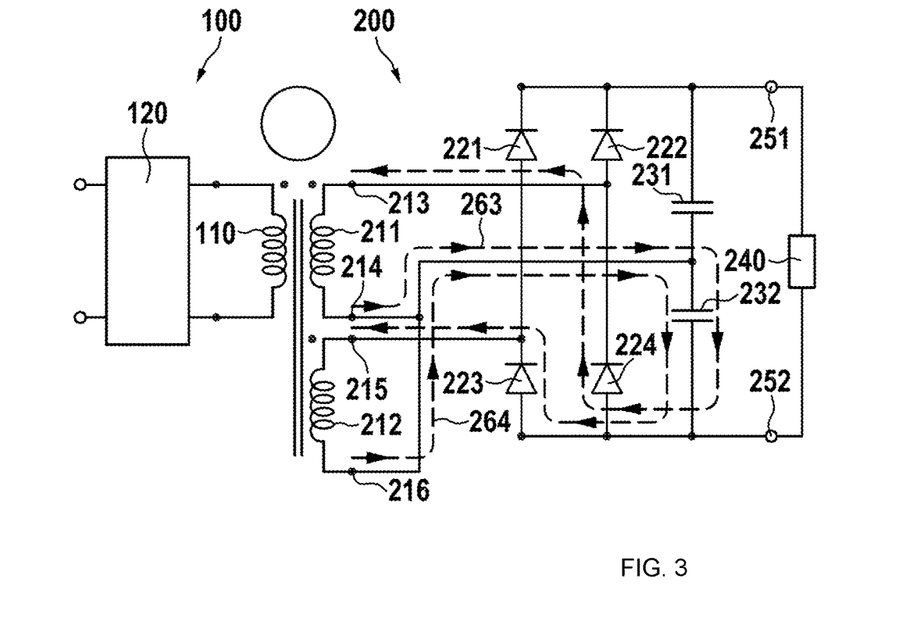
FIG. 3 shows a second current diagram.

In FIG. 3, a second simplified current diagram is shown with the voltages at the first winding output 213, 215 being negative with respect to the voltages at the winding outputs 214, 216. Current through the first secondary winding 211 is propagating from the second winding output 214 via current path 263 through capacitor 232 to the negative output 252 and through rectifier 224 back to the first winding output 213. Current through the second secondary winding 212 is propagating from second winding output 216 via current path 264 through capacitor 232 to the negative output 252 and through rectifier 223 to the first winding output 215. It can be seen in these current diagrams that the current through both secondary windings is flowing at the same time through different rectifiers oriented in the same direction into the same capacitor. As shown in this embodiment, during a positive half wave, the current may charge the first capacitor 231 and during a negative half wave, the current may charge the second capacitor 232.

Figure 4:
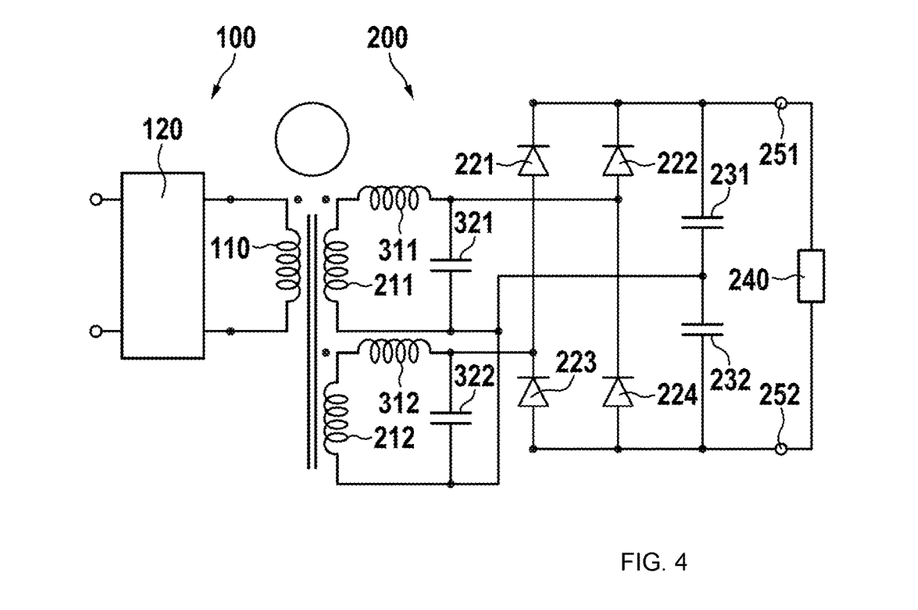
FIG. 4 shows a circuit diagram with parasitic components.

In FIG. 4, a circuit diagram with parasitic components is shown. In addition to the previously shown circuit components, a parasitic series inductance 311 of the first secondary winding 211 and a second stray inductance 312 of the second secondary winding 212 are shown. Furthermore, a first parasitic capacitance 321 of the first secondary winding 211 and a second parasitic capacitance 322 of the second secondary winding 212 are shown. There may be parallel resonances with the mutual inductance of the secondary winding and the parasitic capacitance as well as series resonances with the stray inductances of the secondary winding together with the parasitic capacitances.

Figure 5:
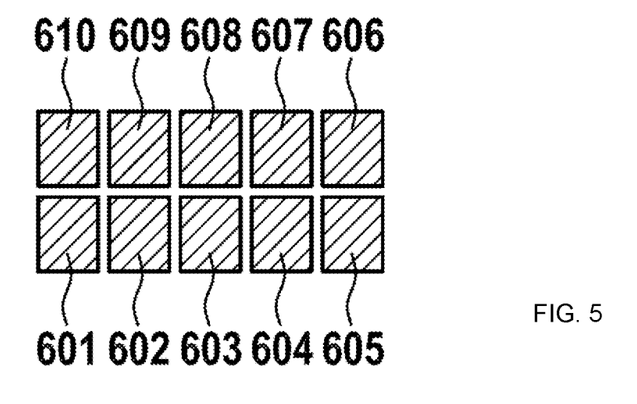
FIG. 5 shows a cross-section through a conventional secondary winding.

In FIG. 5, a cross-section through a conventional secondary winding is shown. There may be one piece of wire wound several times around a bobbin or within a magnetic core. The winding may have a plurality of layers to use the available winding space. Usually, the turns of the windings are wound layer for layer. This figure shows a schematic diagram with a winding starting with a first turn 601 and ending with a tenth turn 610. The turns are wound in sequence. Each turn has a parasitic capacitance as will be shown later, to its neighbored turns. As there are ten turns, the voltage difference between the beginnings of neighbored turns in the same layer is ⅒ of the total voltage. The voltage difference between turns of different layers is determined by the number of turns electrically connected inbetween these turns. For example, between the turns 605 and 606, the voltage is only ⅒ of the total voltage. Between the first turn 601 of the winding and the last turn 610, the voltage is 9/10 of the total voltage. It is noted that the last ⅒ of the voltage is between the beginning and the end of the last turn 610.

Figure 6:
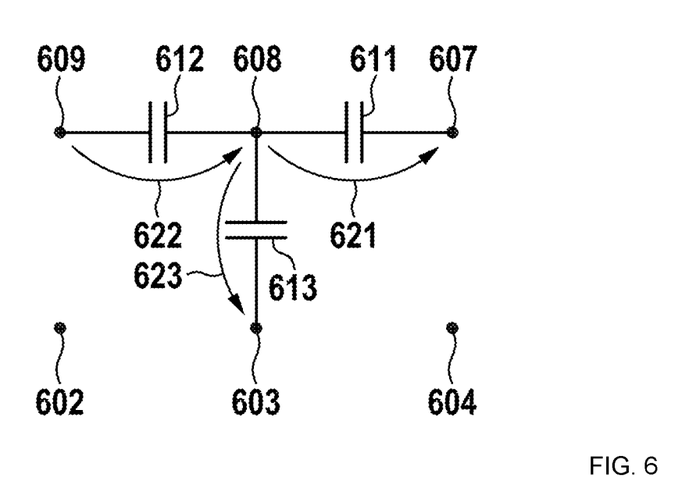
FIG. 6 shows the parasitic capacitances between neighbored windings

In FIG. 6, the parasitic capacitances between neighbored turns are shown in a schematic of a section of the previous Figure. The beginning of turn 608 has parasitic capacitances 611 and 612 between the neighbored turns 607 and 609. The voltages 621 and 622 there-between are ⅒ of the total voltage. The parasitic capacitance 613 between turn 608 and 603 is the same as the parasitic capacitances 621 and 622, but the voltage 623 between turn 608 and 603 is ⅝ of the total voltage, as there are four other turns in-between. Therefore, the current flowing through the parasitic capacitance 613 is 5-times as high as the current through parasitic capacitances 611 and 612. As a consequence, the parasitic capacitance 613 has a significant higher contribution to the total parasitic capacitance the capacitances 611 and 612.

Figure 7:
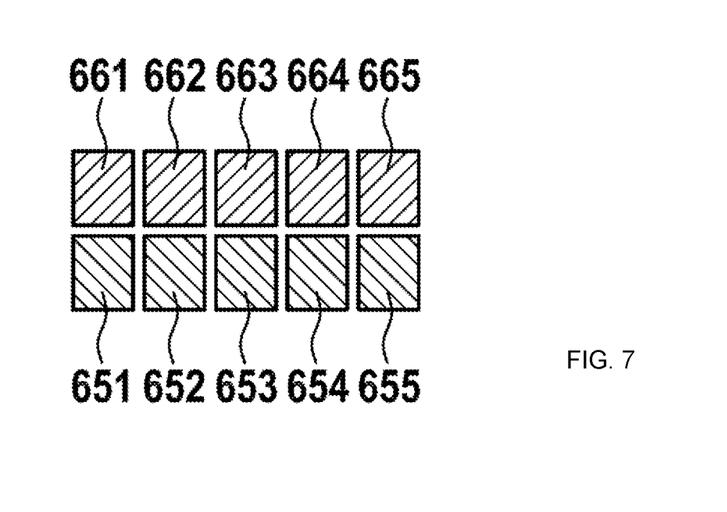
FIG. 7 shows a scheme of a preferred embodiment.

In FIG. 7, a schematic arrangement of a preferred embodiment of the secondary transformer windings is shown. There may be a first secondary winding comprising the turns 651 to 655 and a second secondary winding comprising the turns 661 to 665. The turns marked with a dot in the schematic diagrams may be the turns 651 and 661. As these turns are wound in the same direction, there is the same voltage at these turns, and therefore there is no voltage between the neighbored turns which may be in different layers, like turns 651 and 661. This applies to all successive turns ending with turns 655 and 665 which also have the same voltage.

Figure 8:
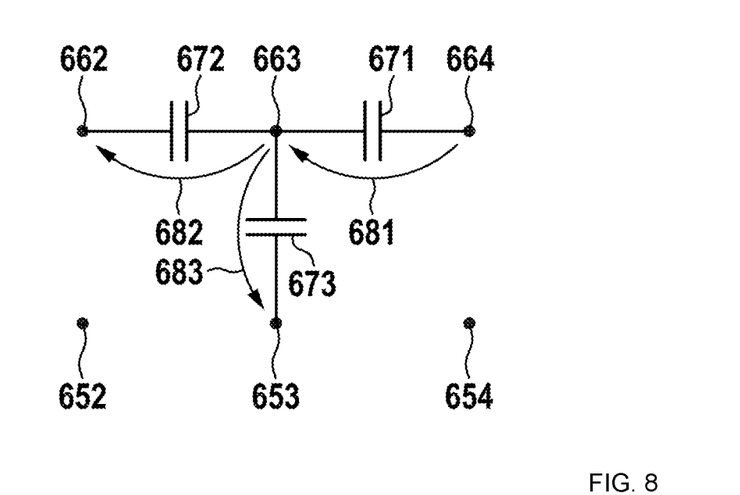
FIG. 8 shows the parasitic capacitances and voltages of a preferred embodiment.

In FIG. 8, the parasitic capacitances and voltages of a preferred embodiment are shown. Again, as previously shown, there are parasitic capacitances 671, 672 and 673 between neighbored windings which have approximately the same capacitance. The voltages 682, 681 between turns 663 and 662, as well as turns 664 and turn 663 are about the same as the voltages between the turns 609, 608 and 607 shown in the previous example. It should be noted that the total voltage at the winding in this embodiment is only half the total voltage compared to the previous example for driving a full-bridge rectifier. Therefore, the voltage difference at five turns is the same as at ten turns in the previous example. As the second secondary winding's turn 663 has the same voltage as the first secondary winding's turn 653, the voltage 683 between these windings is zero, and therefore no current is flowing through the parasitic capacitance 673. As a consequence, there is no contribution of this parasitic capacitance 673 to the total parasitic capacitance. Therefore, by using this winding arrangement, the total effective parasitic capacitance (321, 322) can be reduced, which further leads to a reduction of energy in the resonant circuit, and therefore the base load and a dummy load can further be decreased.

Figure 9:
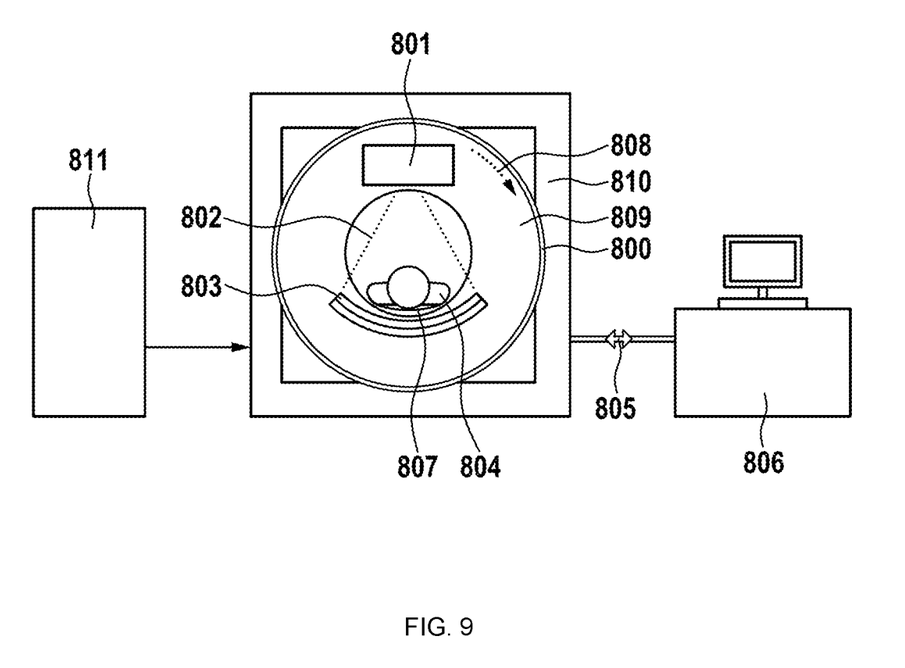
FIG. 9 shows schematically a CT (Computed Tomography) scanner gantry.

FIG. 9 shows schematically a CT (Computed Tomography) scanner gantry. The stationary part is suspended within a massive frame 810. The rotating part 809 of the gantry is rotatably mounted with respect to the stationary part and rotates along the rotation direction 808. The rotating part may be a metal disk which supports an X-ray tube 801, a detector 803 and further electronic and mechanic components. This disk may define a secondary ground. The X-ray tube is used for generating an X-ray beam 802 that radiates through a patient 804 lying on a table 807 and which is intercepted by a detector 803 and converted to electrical signals and imaging data thereof. The data obtained by the detector 803 are transmitted via a contactless rotary joint (not shown) to an evaluation unit 806 by means of a data bus or network 805. Electrical power from a stationary power supply unit 811 may be transmitted by an inductive power coupler 800 to the rotating part. Other scanners like baggage scanners work in a similar way.

It will be appreciated to those skilled in the art having the benefit of this disclosure that this invention provides an inductive power transfer device or rotary joint. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS 100 primary side
110 primary winding
120 inverter
131 primary resonance capacitor
200 secondary side
211, 212 secondary windings
213-216 winding outputs
221-224 rectifiers
231, 232 capacitors
233 filter capacitor
240 load
251 positive output
252 negative output
261-264 current paths
311, 312 stray inductances
321, 322 parasitic capacitances
601-610 prior art secondary winding turns
611-613 prior art parasitic capacitances
621-623 prior art voltages
651-655 first secondary winding turns
661-665 second secondary winding turns
671-673 prior art parasitic capacitances
681-683 prior art voltages 800 inductive power coupler
801 x-ray tube
802 x-ray beam
803 x-ray detector
804 patient
805 network
806 evaluation unit
807 patient table
808 rotation direction
809 rotating part
810 frame
811 power supply unit

The invention claimed is:

1. An inductive power transfer circuit comprising: at least an inductive rotating coupler having a primary side rotatably arranged against a secondary side, the primary side comprising at least one primary winding,
the secondary side comprising at least a first secondary winding and a second secondary winding,
wherein said at least the first secondary winding and the second secondary winding have the same number of turns and are oriented to produce output voltages with the same amplitudes and phases, and have first winding outputs and second winding outputs,
wherein the second winding outputs are connected together and are further connected to a first capacitor and a second capacitor, the first capacitor being connected to a positive output and the second capacitor being connected to a negative output,
wherein each of the first winding outputs is independently connected by a first rectifier in a forward direction to the positive output and by a second rectifier in a reverse direction to the negative output, and
wherein the first capacitor and the second capacitor are configured as part of a total resonance capacitance of a series resonance converter.

2. An inductive power transfer circuit according to claim 1, wherein the total resonance capacitance of the series resonance converter is formed by at least one primary resonance capacitor and on the secondary side by a first capacitor and a second capacitor.

3. An inductive power transfer circuit according to claim 2, wherein a ratio, of a total capacitance of the at least one primary resonance capacitor and a total capacitance of the first and second capacitors on the secondary side, is equal to a square of a winding number ratio, wherein the winding number ratio is a ratio of the at least one secondary winding, from the at least the first secondary winding and the second secondary winding, to the at least one primary winding.

4. An inductive power transfer circuit according to claim 3, wherein the winding number ratio is 2.

5. An inductive power transfer circuit according to claim 1, wherein the at least one primary winding is connected to an inverter for delivering an AC voltage.

6. An inductive power transfer circuit according to claim 1, wherein the at least the first secondary winding and the second secondary winding are wound with at least two turns being in parallel.

7. An inductive power transfer circuit according to claim 1, wherein the at least the first secondary winding and the second secondary winding are wound with at least two turns being parallel in separate layers.

8. An inductive power transfer circuit according to claim 1, wherein a DC/DC converter is provided between the positive output, the negative output and a load.

9. An inductive power transfer circuit comprising: at least an inductive rotating coupler having a primary side rotatably arranged against a secondary side,
the primary side comprising at least one primary winding,
the secondary side comprising at least one secondary winding having a first winding output and a second winding output,
   wherein the second winding output is further connected to a first capacitor and a second capacitor, the first capacitor being connected to a positive output and the second capacitor being connected to a negative output, the first winding output being independently connected by a first rectifier in forward direction to the positive output and a second rectifier being connected in reverse direction to the negative output, and the first capacitor and the second capacitor are configured as part of the total resonance capacitance of a series resonance converter.

10. An inductive power transfer circuit according to claim 9, wherein the total resonance capacitance of the series resonance converter is formed by at least one primary resonance capacitor and on the secondary side by the first capacitor and the second capacitor.

11. An inductive power transfer circuit according to claim 10, wherein a ratio of a total capacitance of the at least one primary resonance capacitor and a total capacitance of capacitators on the secondary side is approximately equal to the square of a winding number ratio of the at least one secondary winding to the at least one primary winding.

12. An inductive power transfer circuit according to claim 11, wherein the winding number ratio is 2.

13. An inductive power transfer circuit according to claim 9, wherein the at least one primary winding is connected to an inverter for delivering an AC voltage.

14. An inductive power transfer circuit according to claim 9, wherein the at least one secondary winding includes a first secondary winding and a second secondary winding that are wound with at least two turns being in parallel.

15. An inductive power transfer circuit according to claim 9, wherein the at least one secondary winding includes a first secondary winding and a second secondary winding that are wound with at least two turns being parallel in separate layers.

16. An inductive power transfer circuit according to claim 9, wherein a DC/DC converter is provided between the positive output, the negative output and a load.

* * * * *